United States Patent
Wang et al.

(10) Patent No.: US 9,503,779 B2
(45) Date of Patent: Nov. 22, 2016

(54) NETWORK CONNECTION CONFIGURATION METHOD FOR MULTIMEDIA PLAYER AND RELATED COMPUTER SYSTEM

(71) Applicant: ALI Corporation, Hsinchu (TW)

(72) Inventors: Houng-Jyh Wang, Hsinchu (TW); Chin-Hung Hsu, Hsinchu (TW)

(73) Assignee: ALI Corporation, Hsinchu (TW)

( * ) Notice: Subject to any disclaimer, the term of this patent is extended or adjusted under 35 U.S.C. 154(b) by 349 days.

(21) Appl. No.: 14/053,578

(22) Filed: Oct. 14, 2013

(65) Prior Publication Data

US 2015/0023649 A1 Jan. 22, 2015

(30) Foreign Application Priority Data

Jul. 22, 2013 (CN) .......................... 2013 1 0309228

(51) Int. Cl.
| | |
|---|---|
| *G06F 15/16* | (2006.01) |
| *H04B 5/00* | (2006.01) |
| *H04N 5/765* | (2006.01) |
| *H04N 21/4363* | (2011.01) |
| *H04L 29/08* | (2006.01) |
| *H04W 76/02* | (2009.01) |
| *H04N 21/442* | (2011.01) |
| *H04W 88/04* | (2009.01) |

(52) U.S. Cl.
CPC ........ *H04N 21/43637* (2013.01); *H04L 67/00* (2013.01); *H04N 21/44227* (2013.01); *H04W 76/021* (2013.01); *H04W 76/023* (2013.01); *H04W 88/04* (2013.01)

(58) Field of Classification Search
CPC ........... H04W 76/023; H04W 76/021; H04N 5/765; H04N 21/44227; H04N 21/00; H04N 21/43637; H04L 67/00
USPC .......................... 709/227; 386/231; 455/41.1
See application file for complete search history.

(56) References Cited

U.S. PATENT DOCUMENTS

| | | | | |
|---|---|---|---|---|
| 8,627,438 B1 * | 1/2014 | Bhimanaik | ......... | H04L 63/0853 726/9 |
| 8,736,878 B2 * | 5/2014 | Grabkowitz | ....... | H04N 1/00225 358/1.15 |
| 8,831,517 B2 * | 9/2014 | Shankaranarayanan | .................... | H04L 12/1475 455/11.1 |
| 8,887,262 B1 * | 11/2014 | Turner | ................ | H04L 63/0853 709/220 |
| 9,066,197 B2 * | 6/2015 | Kiukkonen | ....... | H04W 52/0229 |
| 9,088,672 B2 * | 7/2015 | Shankaranarayanan | .................... | H04L 12/1475 |
| 9,198,213 B2 * | 11/2015 | Kim | .................... | H04W 76/023 |
| 9,241,357 B2 * | 1/2016 | Tanaka | ................ | H04W 76/021 |
| 2002/0026528 A1 * | 2/2002 | Lo | ........................ | H04L 12/2834 709/245 |
| 2010/0147041 A1 * | 6/2010 | Teicher | ................ | E05B 73/0005 70/58 |

(Continued)

*Primary Examiner* — Daniel C Murray
(74) *Attorney, Agent, or Firm* — Winston Hsu; Scott Margo

(57) ABSTRACT

A network connection configuration method for a multimedia player includes establishing a Wireless Fidelity (Wi-Fi) connection between a mobile device and a network connection device, such that the mobile device obtains a service set identification (SSID) and a password thereof of the network connection device; utilizing an image capture module of the mobile device to capture an optical image corresponding to the multimedia player, so as to establish a Wi-Fi Direct connection between the mobile device and the multimedia player; and establishing another Wi-Fi connection between the multimedia player and the network connection device according to the Wi-Fi connection between the mobile device and the network connection device as well as the Wi-Fi Direct connection between the mobile device and the multimedia player.

9 Claims, 6 Drawing Sheets

(56) References Cited

U.S. PATENT DOCUMENTS

| | | | | |
|---|---|---|---|---|
| 2012/0127110 A1* | 5/2012 | Amm | G06F 3/03545 | |
| | | | 345/174 | |
| 2012/0158919 A1* | 6/2012 | Aggarwal | H04L 63/104 | |
| | | | 709/220 | |
| 2012/0158922 A1* | 6/2012 | Aggarwal | H04L 63/104 | |
| | | | 709/220 | |
| 2012/0199643 A1* | 8/2012 | Minnick | G06F 17/30879 | |
| | | | 235/375 | |
| 2012/0264375 A1* | 10/2012 | Shankaranarayanan | H04L 12/1475 | |
| | | | 455/41.2 | |
| 2013/0002441 A1* | 1/2013 | Khan | H04L 67/306 | |
| | | | 340/636.1 | |
| 2013/0107783 A1* | 5/2013 | Shaw | H04W 4/06 | |
| | | | 370/312 | |
| 2013/0128305 A1* | 5/2013 | Grabkowitz | H04N 1/00225 | |
| | | | 358/1.15 | |
| 2013/0268127 A1* | 10/2013 | Casilli | G05D 23/19 | |
| | | | 700/276 | |
| 2013/0331028 A1* | 12/2013 | Kuehnel | H04W 76/02 | |
| | | | 455/41.1 | |
| 2014/0127992 A1* | 5/2014 | Kuscher | H04B 5/0031 | |
| | | | 455/41.1 | |
| 2014/0146731 A1* | 5/2014 | Hynell | H04L 67/141 | |
| | | | 370/311 | |
| 2014/0153557 A1* | 6/2014 | Kim | H04W 76/023 | |
| | | | 370/338 | |
| 2014/0197232 A1* | 7/2014 | Birkler | G06F 21/313 | |
| | | | 235/375 | |
| 2014/0206346 A1* | 7/2014 | Kiukkonen | H04W 52/0229 | |
| | | | 455/426.1 | |
| 2014/0254499 A1* | 9/2014 | Hassan | H04W 12/08 | |
| | | | 370/329 | |
| 2014/0342697 A1* | 11/2014 | Shankaranarayanan | H04L 12/1475 | |
| | | | 455/406 | |
| 2015/0003432 A1* | 1/2015 | Tanaka | H04W 76/021 | |
| | | | 370/338 | |
| 2015/0271163 A1* | 9/2015 | Greenspan | H04L 63/0428 | |
| | | | 713/168 | |
| 2015/0319804 A1* | 11/2015 | Shankaranarayanan | H04L 12/1475 | |
| | | | 455/406 | |

* cited by examiner

NETWORK CONNECTION CONFIGURATION METHOD FOR MULTIMEDIA PLAYER AND RELATED COMPUTER SYSTEM

BACKGROUND OF THE INVENTION

1. Field of the Invention

The present invention relates to a network connection configuration method and a computer system thereof for a multimedia player, and more particularly, to a network connection configuration method and a computer system thereof by utilizing an optical image and a mobile device to set up a connection for a multimedia player.

2. Description of the Prior Art

As digital video/audio advances, users observe all kinds of multimedia video/audio information that are available via different digital video/audio devices. For example, the user can utilize a display device and a multimedia player (such as a set top box, STB) to receive a plurality of radio program contents, and a mobile device can also be utilized to control what to be chosen/determined for displaying from the plurality of radio program contents. In the meanwhile, the mobile device can search for a neighbor access point (AP) to connect with a local area network for the Internet surfing. However, the multimedia player and the AP cannot be directly integrated together, and additional network connection modules are necessary to be installed inside the multimedia player with related network information comprising a user account and/or a network password for the network connection, which leads to inconvenient operations for the users.

Therefore, it is important to provide a network connection configuration method and a computer system thereof for a multimedia player, such that wireless connections between the mobile device, the multimedia player and the AP can be integrated together for users to conveniently finish network connection settings.

SUMMARY OF THE INVENTION

It is therefore an objective of the invention to provide a network connection configuration method and a computer system thereof for a multimedia player, so as to integrate network connection operations/settings between a mobile device, a multimedia player and an access point.

An embodiment of the invention discloses a network connection configuration method for a multimedia player. The network connection configuration method comprises establishing a Wireless Fidelity (Wi-Fi) connection between a mobile device and a network connection device, such that the mobile device obtains a service set identification (SSID) and a password thereof of the network connection device; utilizing an image capture module of the mobile device to capture an optical image corresponding to the multimedia player, so as to establish a Wi-Fi Direct connection between the mobile device and the multimedia player; and establishing another Wi-Fi connection between the multimedia player and the network connection device according to the Wi-Fi connection between the mobile device and the network connection device as well as the Wi-Fi Direct connection between the mobile device and the multimedia player.

An embodiment of the invention discloses another computer system coupled to a multimedia player. The computer system comprises a central processing unit; and a storage device coupled to the central processing unit to store a programming code for instructing the processing unit to process a network connection configuration method for the multimedia player. The network connection configuration method comprises establishing a Wireless Fidelity (Wi-Fi) connection between a mobile device and a network connection device, such that the mobile device obtains a service set identification (SSID) and a password thereof of the network connection device; utilizing an image capture module of the mobile device to capture an optical image corresponding to the multimedia player, so as to establish a Wi-Fi Direct connection between the mobile device and the multimedia player; and establishing another Wi-Fi connection between the multimedia player and the network connection device according to the Wi-Fi connection between the mobile device and the network connection device as well as the Wi-Fi Direct connection between the mobile device and the multimedia player.

An embodiment of the invention discloses another network connection configuration method for a multimedia player. The network connection configuration method comprises providing an optical image corresponding to the multimedia player; after an image capture module of the mobile device captures the optical image of the multimedia player, a Wireless Fidelity (Wi-Fi) Direct connection between the mobile device and the multimedia player is established; and after a Wi-Fi connection between the mobile device and a network connection device is established, the mobile device obtains a service set identification (SSID) and a password thereof of the network connection device, such that another Wi-Fi connection between the multimedia player and the network connection device is established according to the Wi-Fi Direct connection between the mobile device and the multimedia player.

These and other objectives of the present invention will no doubt become obvious to those of ordinary skill in the art after reading the following detailed description of the preferred embodiment that is illustrated in the various figures and drawings.

DETAILED DESCRIPTION

The specification and the claims of the present invention may use a particular word to indicate an element, which may have diversified names named by distinct manufacturers. The present invention distinguishes the element depending on its function rather than its name. The phrase "comprising" used in the specification and the claim is to mean "is inclusive or open-ended but not exclude additional, unrecited elements or method steps." In addition, the phrase "electrically connected to" or "coupled" is to mean any electrical connection in a direct manner or an indirect manner. Therefore, the description of "a first device electrically connected or coupled to a second device" is to mean that the first device is connected to the second device directly or by means of connecting through other devices or methods in an indirect manner.

Figure 1A:
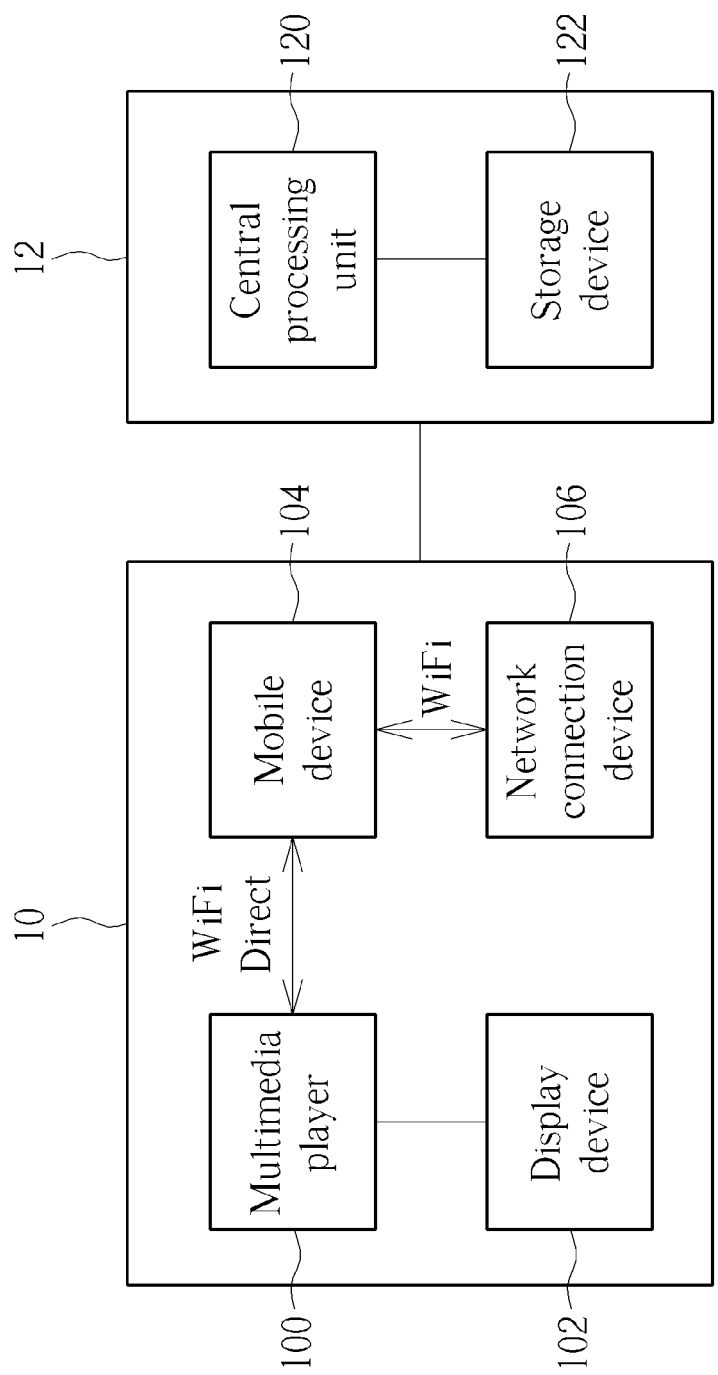
FIG. 1A and FIG. 1B illustrate schematic diagrams of a multimedia system according to an embodiment of the invention.
Figure 1B:
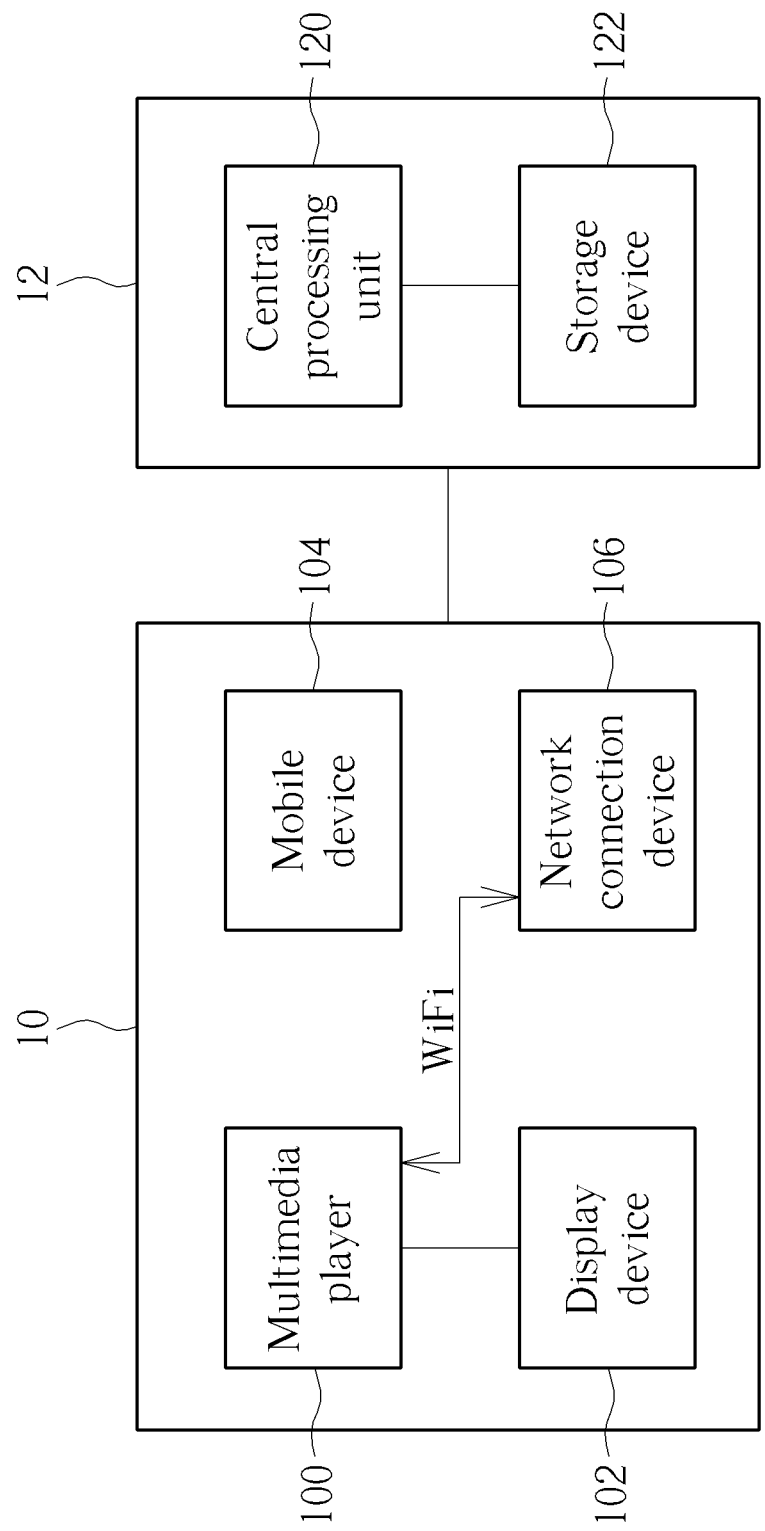

Please refer to FIG. 1A and FIG. 1B, FIG. 1A and FIG. 1B illustrate schematic diagrams of a multimedia system 10 according to an embodiment of the invention. As shown in FIG. 1A and FIG. 1B, the multimedia system 10 is coupled to a computer system 12 and comprises a multimedia player 100, a display device 102, a mobile device 104 and a network connection device 106. In the embodiment, the multimedia player 100 can be a set top box (STB), and is utilized to receive a plurality of multimedia video information and to correspondingly store the plurality of multimedia video information for management. The display device 102 can be a liquid crystal display (LCD) device to display at least one digital video content of the plurality of multimedia video information for observation. The mobile device 104 can be a mobile phone, a tablet, a notebook, a platform device or any mobile computing device to generate a control signal to the multimedia player 100, so as to control related operations of the multimedia player 100. The mobile device 104 also comprises a connection module for Internet services and an image capture module for image capture functions. The network connection device 106 can be an access point (AP) or a router for the multimedia system 10 being connected with the Internet. Besides, the computer system 12 comprises a central processing unit 120 and a storage device 122, and the storage device 122 predetermines a programming code (not shown in the figure) to instruct the central processing unit 120 for processing a network connection configuration method for the multimedia system 10, so as to establish network connections as well as interchange digital information between the mobile device 104, the multimedia player 100 and the network connection device 106.

Figure 2:
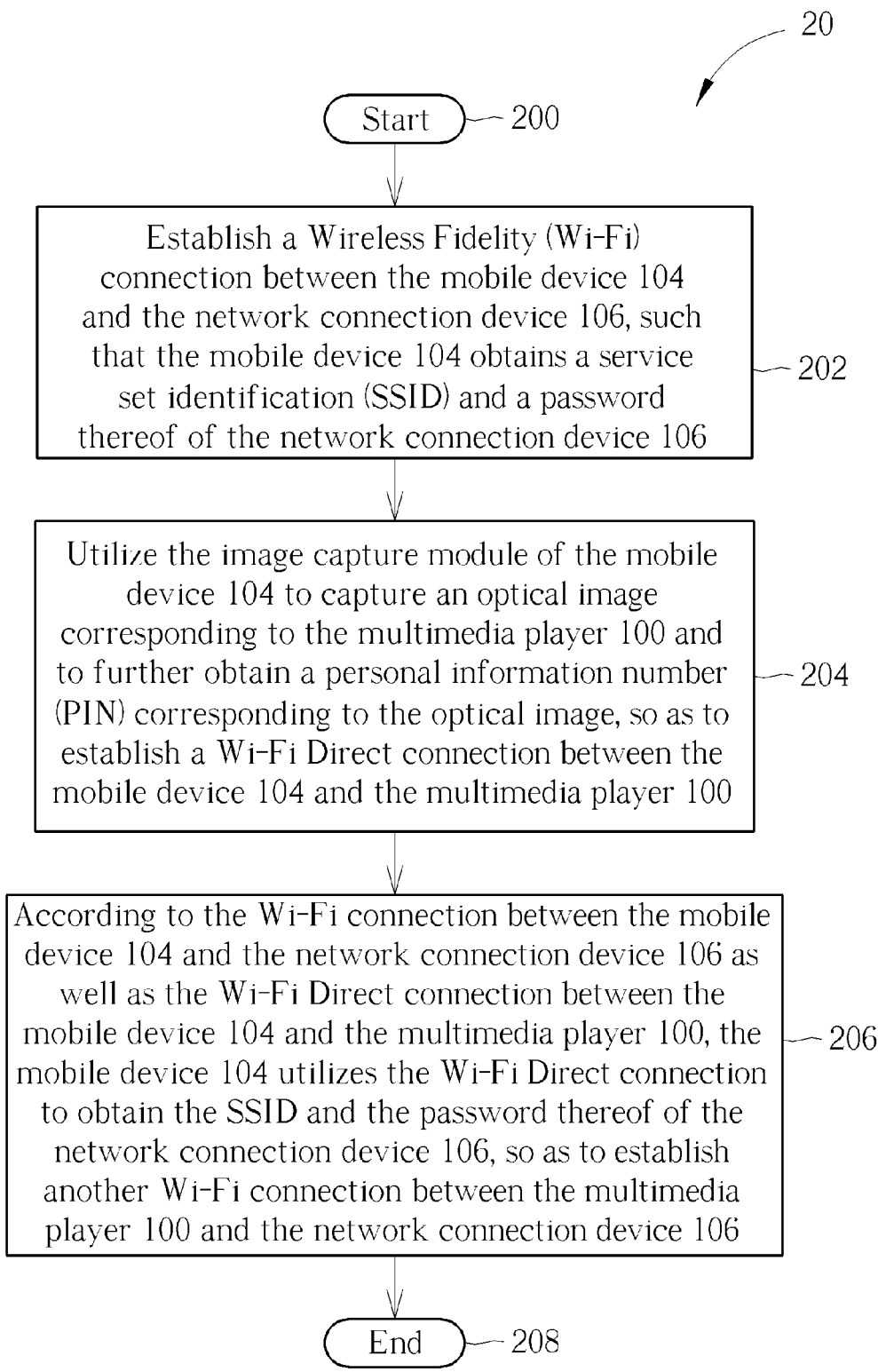
FIG. 2 illustrates a flow chart of a network connection configuration process according to an embodiment of the invention.

Please refer to FIG. 1A, FIG. 1B and FIG. 2, and FIG. 2 illustrates a flow chart of a network connection configuration process 20 according to an embodiment of the invention, wherein those skilled in the art can correspondingly add different programming codes to comply with hardware upgrades of the multimedia system 10 according to different requirements, such that the multimedia system 10 and the computer system 12 can synchronize with each other, which is not limiting the scope of the invention. As shown in FIG. 2, the network connection configuration process 20 comprises, but not limited to, the following steps.

Step 200: Start.

Step 202: Establish a Wireless Fidelity (Wi-Fi) connection between the mobile device 104 and the network connection device 106, such that the mobile device 104 obtains a service set identification (SSID) and a password thereof of the network connection device 106.

Step 204: Utilize the image capture module of the mobile device 104 to capture an optical image corresponding to the multimedia player 100 and to further obtain a personal information number (PIN) corresponding to the optical image, so as to establish a Wi-Fi Direct connection between the mobile device 104 and the multimedia player 100.

Step 206: According to the Wi-Fi connection between the mobile device 104 and the network connection device 106 as well as the Wi-Fi Direct connection between the mobile device 104 and the multimedia player 100, the mobile device 104 utilizes the Wi-Fi Direct connection to obtain the SSID and the password thereof of the network connection device 106, so as to establish another Wi-Fi connection between the multimedia player 100 and the network connection device 106.

Step 208: End.

In the embodiment, after a user initiates the multimedia system 10, a wired/wireless transmission signal or a hardware switch can be adaptively utilized to control the computer system 12 for processing the network connection configuration process 20. In step 202, the mobile device 104 can utilize a wireless connection approach to search for the SSID of the network connection device 106, and the corresponding password of the SSID is entered into the mobile device 104, such that the Wi-Fi connection between the mobile device 104 and the network connection device 106 is established. Accordingly, the mobile device 104 can obtain the SSID and the password thereof of the network connection device 106, and the mobile device 104 can receive a plurality of digital information from the Internet via the network connection device 106.

Figure 3:
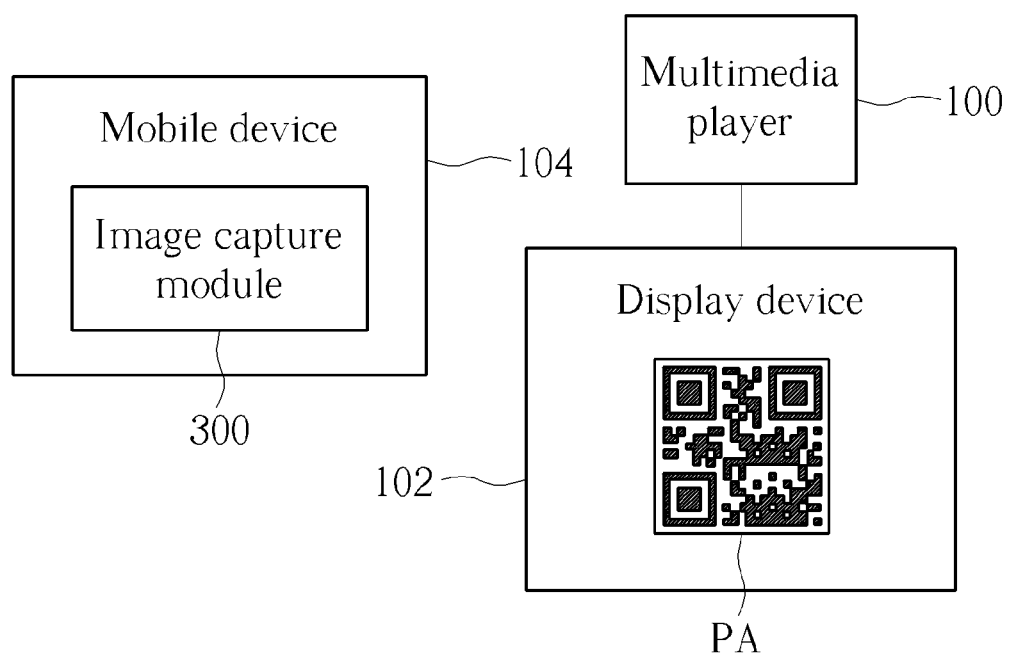
FIG. 3 illustrates a detailed schematic diagram of the mobile device, the multimedia player and the display device according to an embodiment of the invention.

In step 204, please also refer to FIG. 3, which illustrates a detailed schematic diagram of the mobile device 104, the multimedia player 100 and the display device 102 according to an embodiment of the invention. In the multimedia system 10, an image capture module 300 of the mobile device 104 is utilized to capture the optical image PA, so as to obtain the PIN corresponding to the optical image PA and to establish the Wi-Fi Direct connection between the mobile device 104 and the multimedia player 100. As shown in FIG. 3, the mobile device 104 comprises the image capture module 300, and the display device 102 is utilized to display the optical image PA. In the embodiment, the optical image PA can be realized as a quick response code (i.e. QR code), which is not limiting the scope of the invention. Preferably, the optical image PA can be adaptively integrated with the multimedia video information through post-processed operations of the multimedia player 100 or processed by other operations of the display device 102. After initiation, the display device 102 can be simultaneously utilized to display the multimedia video information and the optical image PA. Under such circumstances, the user can adaptively manipulate the image capture module 300, such as a photographing camera or an optical sensing unit, to correspondingly obtain the QR code from the display device 102, and in the meanwhile, the PIN of the QR code can also be interpreted, such that related connection settings for the Wi-Fi Direct connection between the mobile 104 and the multimedia player 100 can be obtained.

Noticeably, those skilled in the art can further combine other Wi-Fi Direct Protected Setup (WPS) operations, such as a push button configuration (PBC) operation, with the operations of the optical image PA and the SSID thereof, to establish the Wi-Fi Direct connection between the mobile 104 and the multimedia player 100, which is also in the scope of the invention.

In step 206, based on the Wi-Fi connection between the mobile device 104 and the network connection device 106 as well as the Wi-Fi Direct connection between the mobile device 104 and the multimedia player 100, the mobile device 104 can utilize the Wi-Fi Direct connection to transmit the SSID and the corresponding password of the network connection device 106 to the multimedia player 100. In that, the multimedia player 100 can utilize a wireless approach for searching for the SSID of the network connection device 106, and the corresponding password can also be automatically entered into for the multimedia player 100, such that another Wi-Fi connection between the multimedia player 100 and the network connection device 106 can be established. Accordingly, the user is not necessary to manually input the SSID and the corresponding password to establish the Wi-Fi connection shown in FIG. 1B. Thus, when the Wi-Fi connection between the mobile device 104 and the network connection device 106 as well as the Wi-Fi Direct connection between the mobile device 104 and the multimedia player 100 have been established, the Wi-Fi connection and the Wi-Fi Direct connection shown in FIG. 1A can assist the Wi-Fi connection shown in FIG. 1B to be established between the multimedia player 100 and the network connection device 106.

Under such circumstances, the user is not required to predetermine wireless connection parameters (such as the SSID and the password thereof in the embodiment) corresponding to the network connection device 106 for the multimedia player 100, and accordingly, the Wi-Fi connection between the multimedia player 100 and the network connection device 106 can be automatically established while the Wi-Fi connection between the mobile device 104 and the network connection device 106 as well as the Wi-Fi Direct connection between the mobile device 104 and the multimedia player 100 have been established. Once the multimedia player 100 and the mobile device 104 are both connected to the network connection device 106, the digital information utilized/processed in the mobile device 104 and the multimedia player 100, such as the plurality of multimedia video information or network information received by the mobile device 104, can be arbitrarily interchanged between any two of the multimedia player 100, the mobile device 104 and the network connection device 106, wherein the multimedia player 100 and the mobile device 104 can utilize different media access control (MAC) addresses while the multimedia player 100 and the mobile device 104 are connected with the network connection device 106.

Figure 4:
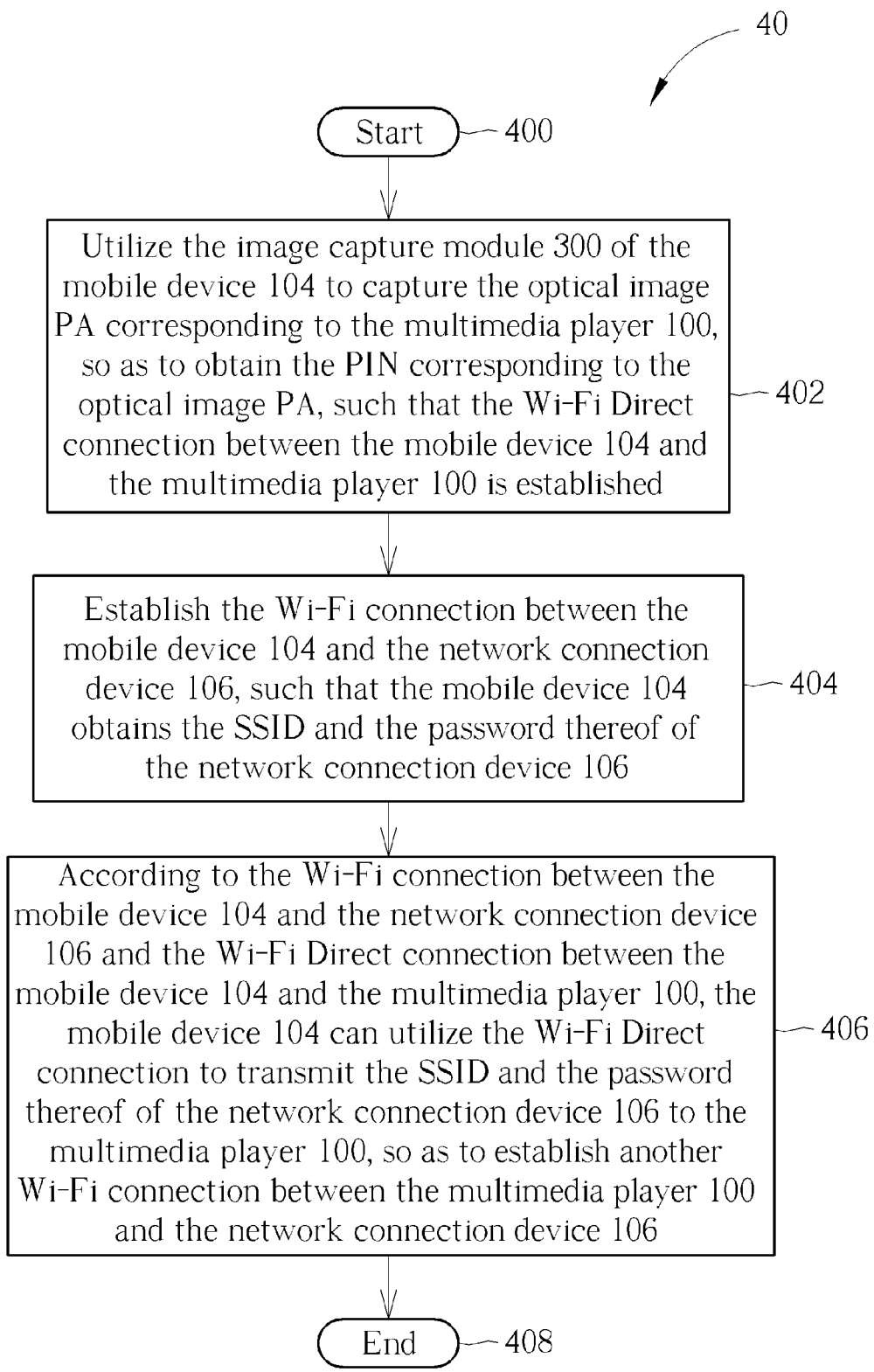
FIG. 4 illustrates a flow chart of another network connection configuration process according to an embodiment of the invention.

Please refer to FIG. 4, which illustrates a flow chart of another network connection configuration process 40 according to an embodiment of the invention, and certainly, those skilled in the art can correspondingly add different programming codes to comply with hardware upgrades of the multimedia system 10 according to different requirements, such that the multimedia system 10 and the computer system 12 can synchronize with each other, which is not limiting the scope of the invention. As shown in FIG. 4, the network connection configuration process 40 comprises, but not limited to, the following steps.

Step 400: Start.

Step 402: Utilize the image capture module 300 of the mobile device 104 to capture the optical image PA corresponding to the multimedia player 100, so as to obtain the PIN corresponding to the optical image PA, such that the Wi-Fi Direct connection between the mobile device 104 and the multimedia player 100 is established.

Step 404: Establish the Wi-Fi connection between the mobile device 104 and the network connection device 106, such that the mobile device 104 obtains the SSID and the password thereof of the network connection device 106.

Step 406: According to the Wi-Fi connection between the mobile device 104 and the network connection device 106 and the Wi-Fi Direct connection between the mobile device 104 and the multimedia player 100, the mobile device 104 can utilize the Wi-Fi Direct connection to transmit the SSID and the password thereof of the network connection device 106 to the multimedia player 100, so as to establish another Wi-Fi connection between the multimedia player 100 and the network connection device 106.

Step 408: End.

Noticeably, step 202 and step 204 of the network connection configuration process 20 can be exchanged to form step 402 and step 404 of the network connection configuration process 40, and additionally, the network connection configuration process 20 and the network connection configuration process 40 share the similar operations, which is not described hereinafter for brevity.

Figure 5:
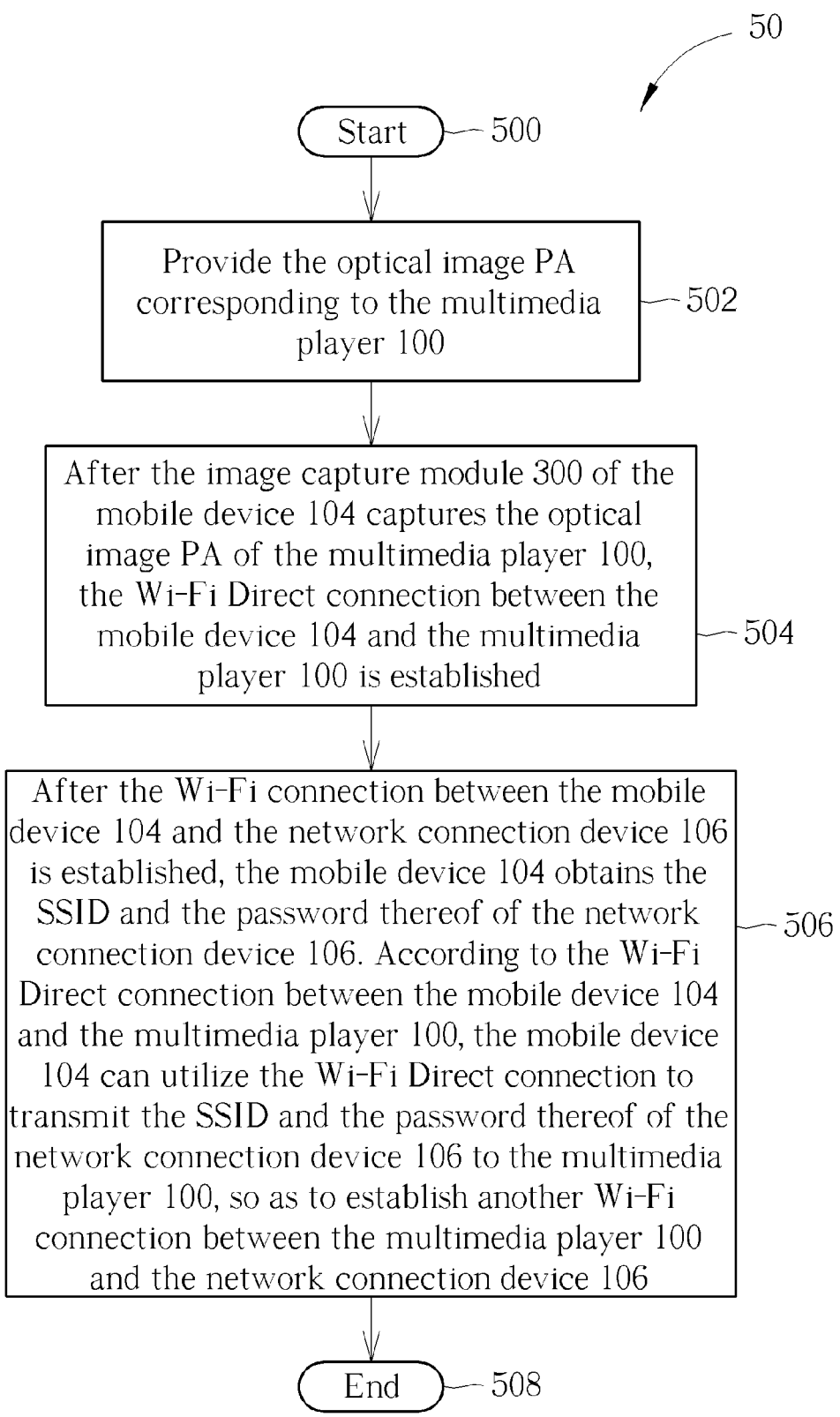
FIG. 5 illustrates a flow chart of another network connection configuration process for a multimedia player according to an embodiment of the invention.

Certainly, the network connection configuration method for the multimedia player 100 can be summarized as another network connection configuration process 50, as shown in FIG. 5, to be complied into another programming code stored in the storage device 122 or a storage unit of the multimedia player 100. Those skilled in the art can also add different programming codes to comply with hardware upgrades of the multimedia player 100 according to different requirements, such that the multimedia system 10 and the computer system 12 can synchronize with each other. As shown in FIG. 5, the network connection configuration process 50 for the multimedia player 100 comprises, but not limited to, the following steps.

Step 500: Start.

Step 502: Provide the optical image PA corresponding to the multimedia player 100.

Step 504: After the image capture module 300 of the mobile device 104 captures the optical image PA of the multimedia player 100, the Wi-Fi Direct connection between the mobile device 104 and the multimedia player 100 is established.

Step 506: After the Wi-Fi connection between the mobile device 104 and the network connection device 106 is established, the mobile device 104 obtains the SSID and the password thereof of the network connection device 106. According to the Wi-Fi Direct connection between the mobile device 104 and the multimedia player 100, the mobile device 104 can utilize the Wi-Fi Direct connection to transmit the SSID and the password thereof of the network connection device 106 to the multimedia player 100, so as to establish another Wi-Fi connection between the multimedia player 100 and the network connection device 106.

Step 508: End.

In the embodiment, the multimedia player 100 can be utilized to process the network connection configuration process 50 and the computer system 12 can also be adaptively utilized to process the network connection configuration process 20 (or the network connection configuration process 40). In other words, the embodiment of the invention can store different programming codes in the storage device 122 of the computer system 12 and the storage unit of the multimedia player 100, respectively. Accordingly, the user can adaptively modify/control synchronization operations between the multimedia system 10 and the computer system 12 according to different requirements, to further integrate more multimedia players 100 and/or mobile devices 104, so as to reduce a computation period of the hardware. More detailed operations of the network connection configuration process 50 can be understood from the network connection configuration process 20 (or the network connection configuration process 40), which is not described hereinafter for brevity.

Noticeably, the network connection configuration process of the invention can adaptively prevent the multimedia player 100 from having to pre-set the network connection parameters of the network connection device 106, and accordingly, another Wi-Fi connection between the multimedia player 100 and the network connection device 106 can be established after the optical image PA is captured by the mobile device 104 and the Wi-Fi Direct connection between the mobile device 104 and the multimedia player 100 is established. Certainly, the number of the multimedia player 100, the display device 102, the mobile device 104 and the network connection device 106 of the multimedia system 10 can be adaptively modified, which is not limiting the scope of the invention. Besides, those skilled in the art can modify an interchange mechanism of the at least one digital information between the multimedia player 100, the mobile device 104 and the network connection device 106 to cooperate with other operations well known in the same field, which is also in the scope of the invention. For example, the mobile device 104 can first obtain the plurality of multimedia video information of the multimedia player 100, and then processes the Internet search for at least one multimedia video information interested by the user, or the multimedia player 100 can first receive a control command from the mobile device 104, and then generate an update information (or a feedback information) to be transmitted to a multimedia video provider, which is also in the scope of the invention.

In summary, the embodiments of the invention provide the network connection configuration method for the multimedia player. First, the Wi-Fi connection between the mobile device 104 and the network connection device 106 (such as the AP) is established, and then the mobile device 104 obtains the SSID and the password thereof of the network connection device 106. Next, the Wi-Fi Direct connection between the mobile device 104 and the multimedia player 100 is established, and the mobile device 104 can utilize the Wi-Fi Direct connection to transmit the SSID and the password thereof of the network connection device 106 to the multimedia player 100, such that the multimedia player 100 can utilize the wireless approach to search for the SSID of the network connection device 106 and automatically enter the corresponding password, so as to establish another Wi-Fi connection between the multimedia player 100 and the network connection device 106. Also, the Wi-Fi Direct connection can be realized via the PIN operation or the PBC operation, and the multimedia player 100 and the mobile device 104 can utilize different MAC addresses to be connected with the network connection device 106. In comparison with the prior art, the embodiments of the invention can adaptively establish the connections between the mobile device 104, the multimedia player 100 and the network connection device 106, and the user can conveniently finish the related network configuration/setting to enlarge the application range of the multimedia system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network connection configuration method for a multimedia player comprising:
   establishing a Wireless Fidelity (Wi-Fi) connection between a mobile device and a network connection device, such that the mobile device obtains a service set identification (SSID) and a password thereof of the network connection device;
   utilizing an image capture module of the mobile device to capture an optical image corresponding to the multimedia player, so as to establish a Wi-Fi Direct connection between the mobile device and the multimedia player; and
   establishing another Wi-Fi connection between the multimedia player and the network connection device according to the Wi-Fi connection between the mobile device and the network connection device as well as the Wi-Fi Direct connection between the mobile device and the multimedia player;
   wherein the optical image comprises a personal information number (PIN) utilized for the Wi-Fi Direct connection, such that the PIN of the optical image is utilized for establishing the Wi-Fi Direct connection between the mobile device and the multimedia player after the PIN corresponding to the multimedia player is captured, and the SSID and the password thereof of the network connection device is correspondingly transmitted to the multimedia player to establish the Wi-Fi connection between the multimedia player and the network connection device.

2. The network connection configuration method of claim 1, wherein the optical image is displayed on a display device coupled to the multimedia player, and the network connection device is an access point (AP) or a router.

3. The network connection configuration method of claim 1, wherein after the Wi-Fi connection between the multimedia player and the network connection device is established, two of the multimedia player, the mobile device and the network connection device interchange at least one digital information, and the multimedia player and the mobile device utilize different media access control (MAC) addresses.

4. A computer system coupled to a multimedia player comprising:
   a central processing unit; and
   a storage device coupled to the central processing unit to store a programming code for instructing the central processing unit to process a network connection configuration method for the multimedia player, the network connection configuration method comprising:
      establishing a Wireless Fidelity (Wi-Fi) connection between a mobile device and a network connection device, such that the mobile device obtains a service set identification (SSID) and a password thereof of the network connection device;
      utilizing an image capture module of the mobile device to capture an optical image corresponding to the multimedia player, so as to establish a Wi-Fi Direct connection between the mobile device and the multimedia player; and
      establishing another Wi-Fi connection between the multimedia player and the network connection device according to the Wi-Fi connection between the mobile device and the network connection device as well as the Wi-Fi Direct connection between the mobile device and the multimedia player;
      wherein the optical image comprises a personal information number (PIN) utilized for the Wi-Fi Direct connection, such that the PIN of the optical image is utilized for establishing the Wi-Fi Direct connection between the mobile device and the multimedia player after the PIN corresponding to the multimedia player is captured, and the SSID and the password thereof of the network connection device is correspondingly transmitted to the multimedia player to establish the Wi-Fi connection between the multimedia player and the network connection device.

5. The computer system of claim 4, wherein the optical image is displayed on a display device coupled to the multimedia player, and the network connection device is an access point (AP) or a router.

6. The computer system of claim 4, wherein the network connection configuration method further comprises:
after the Wi-Fi connection between the multimedia player and the network connection device is established, two of the multimedia player, the mobile device and the network connection device interchange at least one digital information, and the multimedia player and the mobile device utilize different media access control (MAC) addresses.

7. A network connection configuration method for a multimedia player comprising:
providing an optical image corresponding to the multimedia player;
after an image capture module of the mobile device captures the optical image of the multimedia player, a Wireless Fidelity (Wi-Fi) Direct connection between the mobile device and the multimedia player is established; and
after a Wi-Fi connection between the mobile device and a network connection device is established, the mobile device obtains a service set identification (SSID) of the network connection device and a password corresponding to the SSID, such that another Wi-Fi connection between the multimedia player and the network connection device is established according to the SSID, the password and the Wi-Fi Direct connection between the mobile device and the multimedia player;
wherein the optical image comprises a personal information number (PIN) utilized for the Wi-Fi Direct connection, such that the PIN of the optical image is utilized for establishing the Wi-Fi Direct connection between the mobile device and the multimedia player after the PIN corresponding to the multimedia player is captured, and the SSID and the password thereof of the network connection device is correspondingly transmitted to the multimedia player to establish the Wi-Fi connection between the multimedia player and the network connection device.

8. The network connection configuration method of claim 7, wherein the optical image is displayed on a display device coupled to the multimedia player, and the network connection device is an access point (AP) or a router.

9. The network connection configuration method of claim 7, wherein after the Wi-Fi connection between the multimedia player and the network connection device is established, two of the multimedia player, the mobile device and the network connection device interchange at least one digital information, and the multimedia player and the mobile device utilize different media access control (MAC) addresses.

* * * * *